(12) United States Patent
Kamfors et al.

(10) Patent No.: US 10,405,488 B2
(45) Date of Patent: Sep. 10, 2019

(54) ZONE CONTROL SYSTEM FOR A ROBOTIC VEHICLE

(71) Applicant: HUSQVARNA AB, Huskvarna (SE)

(72) Inventors: Mattias Kamfors, Jönköping (SE); Patrik Jägenstedt, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 79 days.

(21) Appl. No.: 15/538,343

(22) PCT Filed: Oct. 19, 2015

(86) PCT No.: PCT/IB2015/058039
§ 371 (c)(1),
(2) Date: Jun. 21, 2017

(87) PCT Pub. No.: WO2016/103066
PCT Pub. Date: Jun. 30, 2016

(65) Prior Publication Data
US 2018/0255704 A1    Sep. 13, 2018

Related U.S. Application Data

(60) Provisional application No. 62/095,824, filed on Dec. 23, 2014.

(51) Int. Cl.
*A01D 34/00* (2006.01)
*G05D 1/02* (2006.01)

(52) U.S. Cl.
CPC ......... *A01D 34/008* (2013.01); *G05D 1/0274* (2013.01); *G05D 1/0278* (2013.01); *G05D 2201/0208* (2013.01)

(58) Field of Classification Search
CPC ........ A01D 34/00; A01D 34/008; G05D 1/00; G05D 1/0274; G05D 1/0278
See application file for complete search history.

(56) References Cited

U.S. PATENT DOCUMENTS

| | | | | |
|---|---|---|---|---|
| 4,176,395 A | * | 11/1979 | Evelyn-Veere | A01G 25/16 |
| | | | | 700/284 |
| 7,225,037 B2 | * | 5/2007 | Shani | G05B 19/056 |
| | | | | 700/18 |

(Continued)

FOREIGN PATENT DOCUMENTS

| EP | 2390746 A2 | 11/2011 |
|---|---|---|
| WO | 2014027946 A1 | 2/2014 |

OTHER PUBLICATIONS

International Search Report and Written Opinion for International Application No. PCT/IB2015/058039 dated May 30, 2016.

(Continued)

*Primary Examiner* — Yonel Beaulieu
(74) *Attorney, Agent, or Firm* — Burr Forman McNair (57) ABSTRACT

A method may include receiving map data descriptive of a plurality of zones located within a parcel of land and receiving information indicative of a plurality of reference coordinates or objects including at least a first and second reference coordinate or object located on the parcel, in which the first and second reference coordinate or object each has corresponding information for defining boundaries for a first workable zone and a second workable zone on the parcel associated therewith, respectively. The method may further include determining the boundaries of the first and second workable zones responsive to detection of at least the first and second reference coordinate or object, respectively. The method may also include receiving time-scheduling instructions for the first and second workable zones, and operating the robotic vehicle to remain within the first and second workable zones in response to the time-scheduling instructions.

19 Claims, 8 Drawing Sheets

(56) References Cited

U.S. PATENT DOCUMENTS

| | | | |
|---|---|---|---|
| 8,989,908 B2* | 3/2015 | Marsters | A01G 25/16 340/10.1 |
| 9,192,109 B1* | 11/2015 | Wieting | A01G 25/092 |
| 2005/0085928 A1* | 4/2005 | Shani | G05B 19/056 700/18 |
| 2009/0228165 A1 | 9/2009 | Ozick et al. | |
| 2011/0295423 A1* | 12/2011 | Anderson | G05D 1/0088 700/248 |
| 2012/0203586 A1* | 8/2012 | Blakely | G06Q 10/06 705/7.12 |
| 2015/0147119 A1* | 5/2015 | Christiansen | A01G 25/167 405/37 |
| 2015/0150201 A1* | 6/2015 | Marsters | A01G 25/16 700/284 |
| 2016/0026940 A1* | 1/2016 | Johnson | A01D 91/00 705/7.11 |
| 2016/0123618 A1* | 5/2016 | Hester | G05B 15/02 700/276 |
| 2016/0123619 A1* | 5/2016 | Hester | G05B 13/028 700/276 |
| 2016/0139607 A1* | 5/2016 | Hamann | C02F 1/006 700/282 |
| 2016/0353678 A1* | 12/2016 | Marsters | A01G 25/16 |
| 2018/0027725 A1* | 2/2018 | Koutsorodi | A01B 79/005 |
| 2018/0084741 A1* | 3/2018 | Gilliam | A01G 25/165 |

OTHER PUBLICATIONS

International Preliminary Report on Patentability for International Application No. PCT/IB2015/058039 dated Jun. 27, 2017.

* cited by examiner

ZONE CONTROL SYSTEM FOR A ROBOTIC VEHICLE

CROSS REFERENCE TO RELATED APPLICATIONS

The present application claims priority to U.S. patent application No. 62/095,824 filed Dec. 23, 2014, which is expressly incorporated by reference in its entirety.

TECHNICAL FIELD

Example embodiments generally relate to robotic vehicles, such as mowing devices, and more particularly robotic vehicles that are configurable to operate within one or more discrete workable zones based at least in part on scheduling and/or task instructions related to the plurality of discrete workable zones.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Lawn mowers are typically capable of transiting over even and uneven terrain to execute yard maintenance activities relating to mowing. However, most lawn mowers are repeatedly exposed to the same operating environments over the course of their lifetimes. For example, a lawn mower may operate to cut a single yard over its entire life, or may operate to cut a relatively fixed series of yards or parcels if it is used for commercial purposes. Given that computing devices are becoming more ubiquitous, it is to be expected that they may be employed to assist in operation of lawn mowers. As such, many additional functionalities may be provided or supported by the employment of computing devices on lawn mowers.

BRIEF SUMMARY OF SOME EXAMPLES

Some example embodiments may therefore provide a lawn device having an onboard vehicle positioning module that may be configured to reference a map that is associated with the parcel currently worked. The map may include defined boundaries for one or more zones of operation of the device where the boundaries are defined relative to known locations of one or more reference objects or coordinates (e.g., GPS coordinates) that are detectable via an object detection module and/or positioning module.

For instance, some example embodiments may provide a robotic vehicle including processing circuitry configured for performing a method including receiving map data descriptive of a plurality of zones located within a parcel of land and receiving information indicative of a plurality of reference coordinates or objects including at least a first and second reference coordinate or object located on the parcel. The first and second reference coordinate or object each, for example, has corresponding information for defining boundaries for a first workable zone and a second workable zone on the parcel associated therewith, respectively. The method may further include determining the boundaries of the first and second workable zones responsive to detection of at least the first and second reference coordinate or object, respectively. The method may also include receiving time-scheduling instructions for the first and second workable zones, and operating the robotic vehicle to remain within the first and second workable zones in response to the time-scheduling instructions.

Some example embodiments may improve the ability of operators and/or fleet managers to make lawn vehicles (e.g., mowers) operate safely and/or efficiently.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

Figure 1:
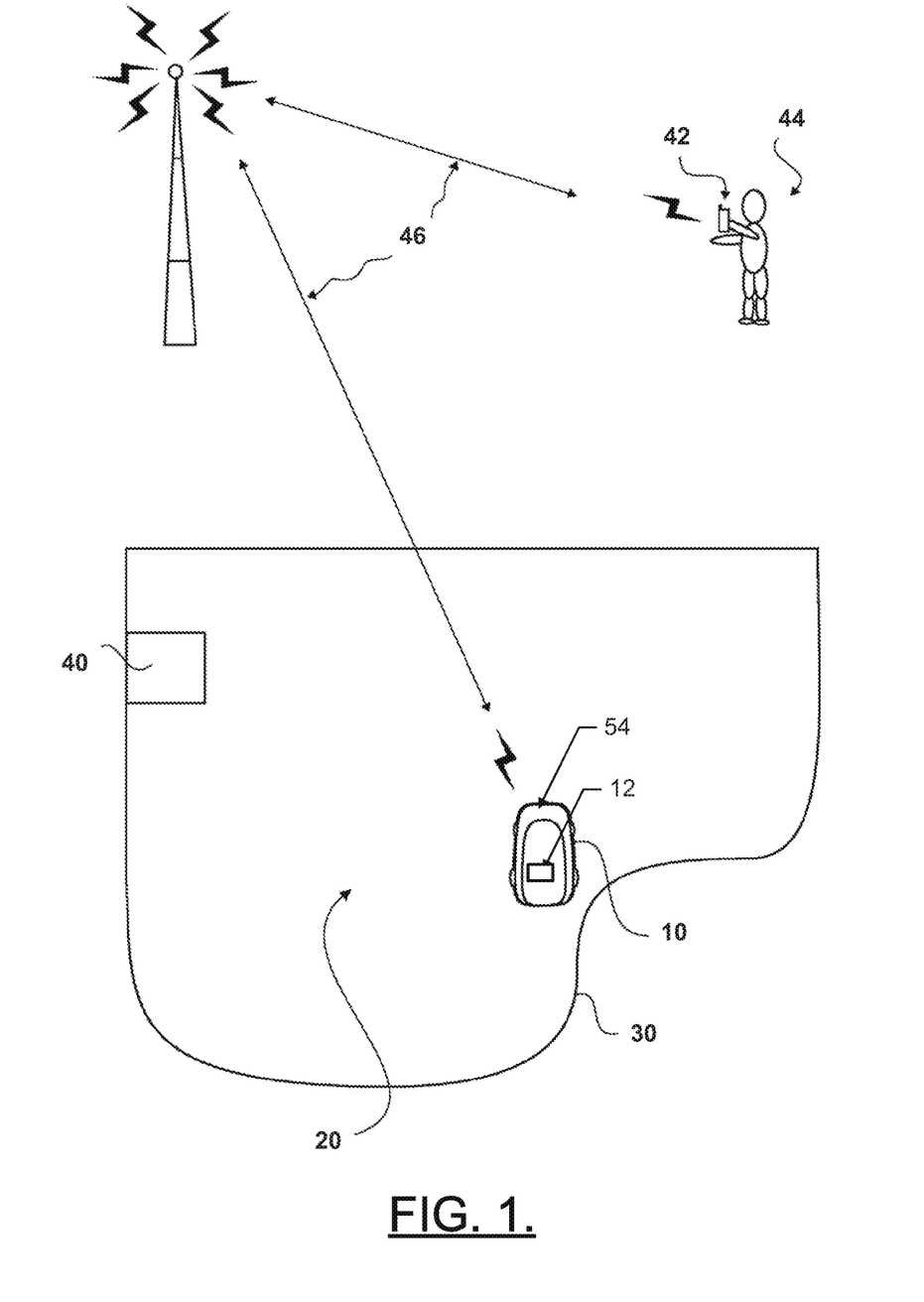
FIG. 1 illustrates an example operating environment for a robotic vehicle.

Robotic mowers typically mow an area that is defined by a boundary wire that bounds the area to be mowed. The robotic mower than roams within the bounded area to ensure that the entire area is mowed, but the robotic mower does not go outside of the bounded area. FIG. 1 illustrates an example operating environment for a robotic mower 10 that may employ a system bounded by such a boundary wire. The robotic mower 10 may operate to cut grass on a parcel 20 (i.e., a land lot), the boundaries of which may be defined using one or more physical boundaries (e.g., a fence, wall, curb and/or the like), a boundary wire 30 or combinations thereof. The boundary wire 30 may emit electrical signals that are detectable by the robotic mower 10 to inform the robotic mower 10 when a boundary of the parcel 20 has been reached. The robotic mower 10 may be controlled, at least in part, via control circuitry 12 located onboard. The control circuitry 12 may include, among other things, the ability to detect the boundary wire 30 to redirect the robotic mower 10 to other areas within the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry in a manner that enables the robotic mower 10 to systematically traverse the parcel while operating a cutting blade to cut the grass on the work area of the parcel 20.

In some embodiments, the control circuitry 12 may be configured to communicate wirelessly with an electronic device 42 (e.g., a computer, mobile telephone, PDA, smart phone, and/or the like) of a remote operator 44 via a wireless communication network 46.

However, the wireless network 46 and other remote devices may not be employed in some embodiments. The wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases.

Communication between the wireless network 46 and the devices or databases (e.g., servers, electronic device 42, control circuitry 12) may be accomplished by either wireline or wireless communication mechanisms and corresponding protocols.

Figure 2A:
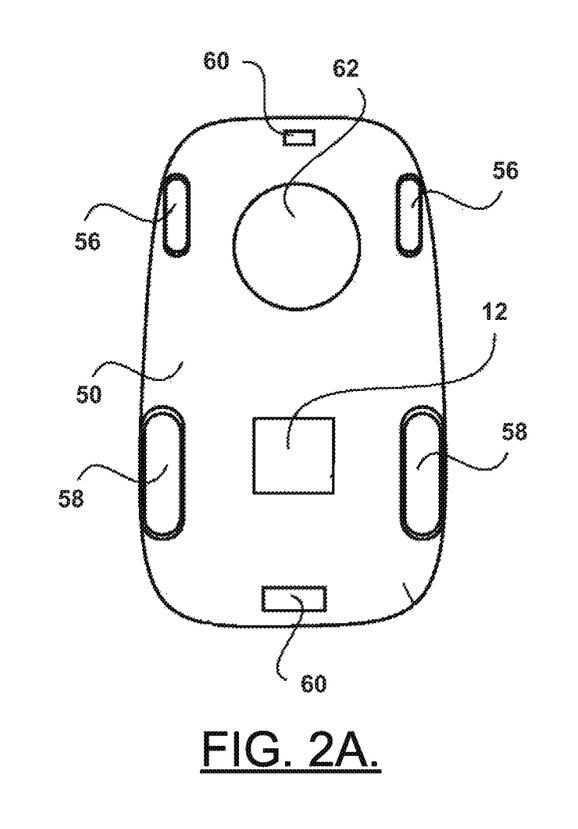
FIG. 2A illustrates a schematic view of a base plate and various components of the robotic vehicle according to an example embodiment.
Figure 2B:
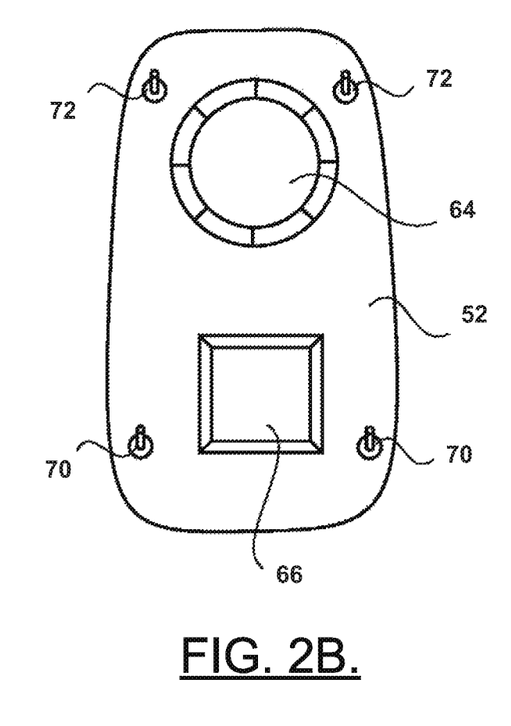
FIG. 2B illustrates a schematic view of an inner housing and various other components of the robotic vehicle according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. FIG. 2A illustrates a schematic view of a base plate and various components of the robotic mower according to an example embodiment and FIG. 2B illustrates a schematic view of an inner housing and various other components of the robotic mower according to an example embodiment.

Referring to FIGS. 1 and 2, the robotic mower 10 may include a base plate 50, an inner housing 52 and an outer housing 54. The inner housing 52 may be configured to be arranged on top of the base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. Alternatively, the front wheels 56 may be swivel wheels capable of following any direction as required by the control of the rear wheels 58.

In an example embodiment, the base plate 50 may further include one or more sensors 60 that may be used to detect the boundary wire 30 and/or objects that may form part of the boundary of the parcel. The sensors 60 may also detect objects that may be encountered during operation of the robotic mower 10 within the boundaries of the parcel 20. These objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point or other key features) of the parcel 20, or determining a position history or track of the robotic mower 10 over time.

The base plate 50 may further support a cutting motor 62 configured to drive a cutting blade or other cutters of the robotic mower 10. In some embodiments, the outer housing 54 and the inner housing 52 may be plastic, light metal, or other similarly lightweight components. The inner housing 52 may include a cover 64 for the cutting motor 62. In some embodiments, a user interface (e.g., display 66) may be provided on the inner housing 52. The user interface may be employed to interface with the control circuitry 12 for controlling operations of the robotic mower 10.

In some embodiments, the sensors 60 may include sensors specifically provided for detecting objects (other than the boundary wire 30 or objects forming boundaries of the parcel 20) and/or sensors for detecting lifting (or tipping beyond a threshold amount) of the robotic mower 10. Alternatively, separate sensors (e.g., collision sensors 70 and lifting sensors 72) may be provided for each function, and those sensors may be capable of communicating with the control circuitry 12 in addition to the sensors 60. In an example embodiment, the sensors 60 may include a camera, which may be used to optically determine the existence of objects in view of the camera and, in some embodiments, may be configured to determine or distinguish an identity of the object (e.g., to determine if an object is a reference object).

The type of work area definition described above tends to work well for many users. However, some users may find installation of the boundary wire 30 to be a relatively difficult and time consuming task. Furthermore, if the boundary wire 30 is damaged, it may be relatively difficult to repair. Additionally, both the initial cost of the boundary wire 30, and any replacement cost that might be encountered if the boundary wire 30 is destroyed, add to the overall cost of the system. Thus, it may be advantageous to define the work area by another mechanism that is less costly and less work intensive.

Some example embodiments may therefore be provided that enable a work area to be defined relative to map data indicative of the parcel. Accordingly, for example, one or more reference points may be defined on the map and boundaries for the work area may be defined in relation to the one or more reference points. The robotic mower may therefore identify a reference point. The robotic mower may further be enabled to determine its position relative to the reference point and boundaries that are defined relative to the reference point based on tracking its position relative to the map data. Accordingly, with potentially less physical effort and less cost, the bounded area in which the robotic mower is to work may be reliably defined.

Other robotic vehicles (e.g., a robotic watering vehicle) may operate in similarly defined areas, but an example embodiment will be described herein in connection with a robotic mower. However, it should be appreciated that example embodiments are not limited to application only on robotic mowers. Instead, example embodiments may also be practiced in connection with other robotic vehicles that operate within bounded regions.

In an example embodiment, a robotic vehicle (e.g., a remote-controlled or autonomously operable robotic mower, watering robot, and/or the like) is provided with an onboard positioning module and an object detection module. The positioning module may be configured to enable data related to position and/or orientation information regarding the vehicle to be tracked and/or recorded. The position and/or orientation information may then be stored and/or processed (e.g., by onboard or remote processing and storage equipment) to generate or augment map data associated with a parcel being worked. The map data may include defined boundaries for operation of the vehicle and may also define the location of reference objects located within (or at edges of) the boundaries, where the reference objects are used as points of reference from which the boundaries are defined using the map data. The object detection module may be configured to detect objects encountered by the device during operation on within the boundaries. Responsive to detection of an object that corresponds to a reference object, the object detection module may be configured to inform the positioning module of the detection so that the positioning module can be used in connection with the object detection module for determining a position of a boundary relative to the reference object. The robotic vehicle may then be steered or otherwise operated accordingly. In this regard, for example, the robotic vehicle may be steered away when any boundary is reached.

Additionally or alternatively, some embodiments may be employed to provide feedback, warnings, or even implement automatic functionality (e.g., stopping blade rotation and/or stopping drive power application) responsive to detection of movement outside of the bounded area.

Figure 3:
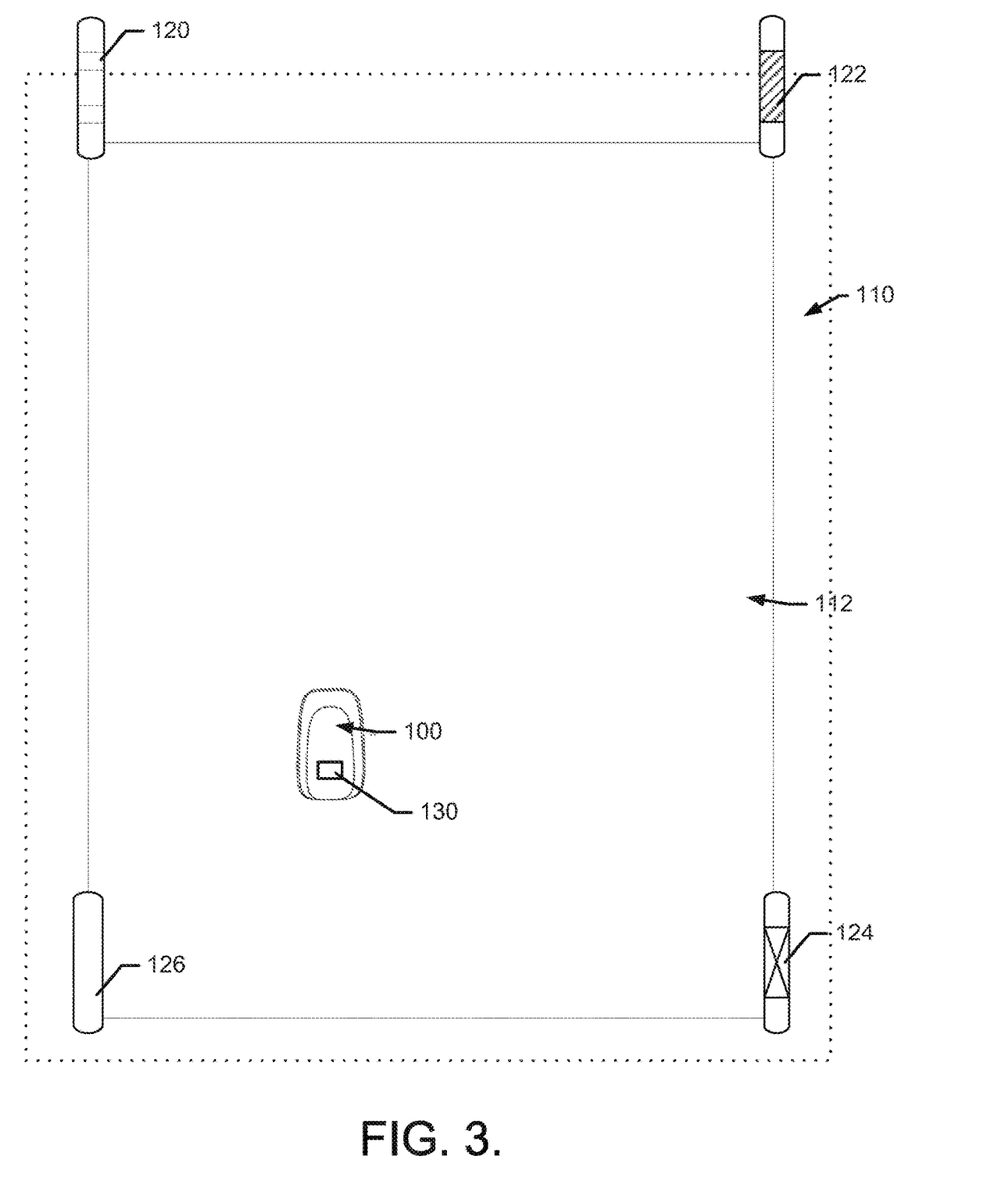
FIG. 3 illustrates an example operating environment for a robotic vehicle that may employ an example embodiment.

FIG. 3 illustrates an example environment in which the robotic mower 100 of an example embodiment may operate. The robotic mower 100 may be battery powered, as described above, and may charge at a charging station and also have the communication capabilities described above. The robotic mower 100 may also include similar sensors and other structural components to those described above. As shown in FIG. 3, a parcel 110 may include a plurality of reference objects (e.g., a first reference object 120, a second reference object 122, a third reference object 124 and a fourth reference object 126). The reference objects may, in this example, be positioned at four corners of a rectangular shaped region on the parcel 110 to define a work area 112. However, it should be appreciated that the reference objects could be positioned to define any desirable shape, and that the reference objects need not necessarily be positioned at corners or even edges of the parcel 110. It should also be noted that although the reference objects are each shown as posts or stakes that have uniquely different markings thereon, it is not necessary that reference objects include any markings at all, much less distinct markings. However, some embodiments may employ identifying indicia, so that the robotic mower 100 can determine which specific reference object is being encountered at any given time.

Figure 4:
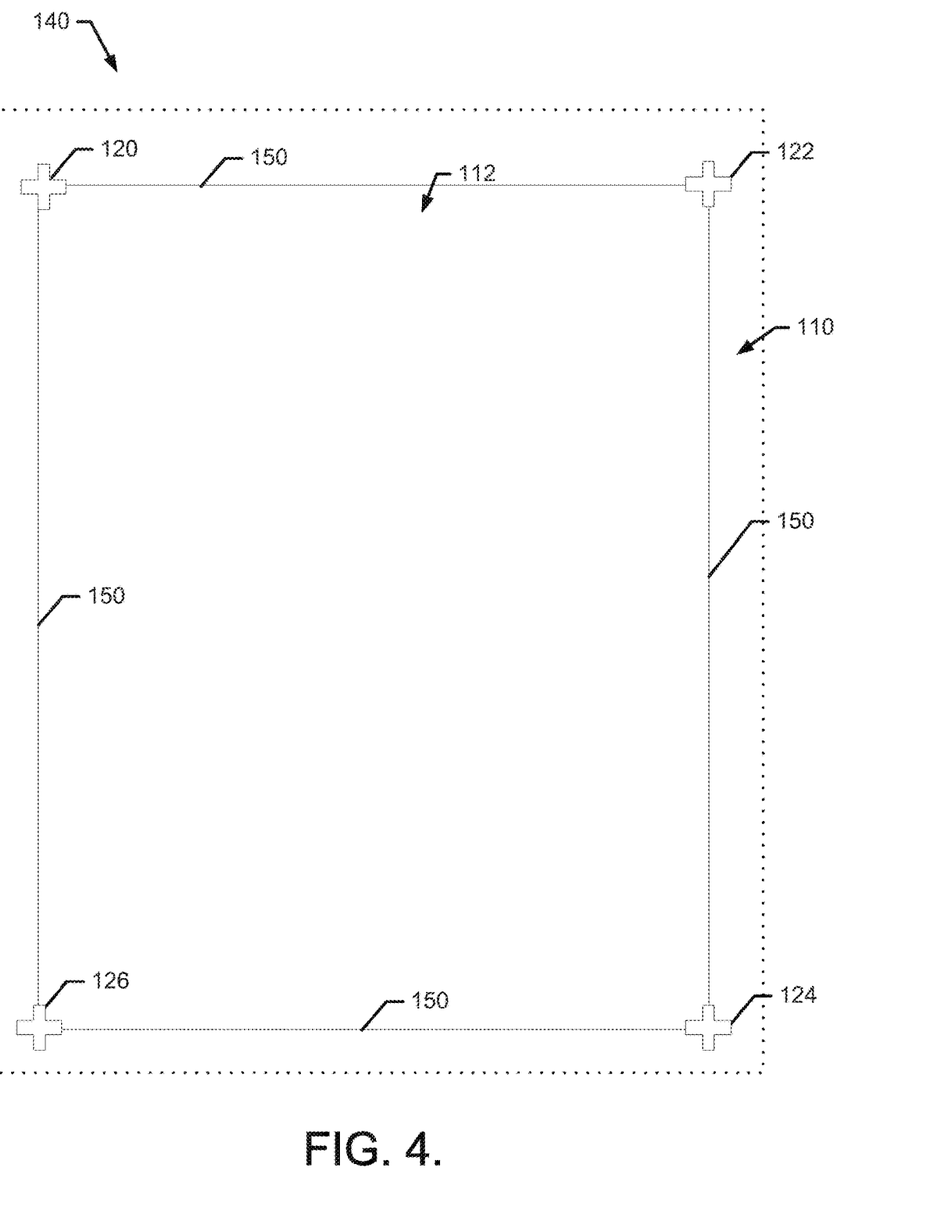
FIG. 4 illustrates an example of map data that may be defined to represent all or a portion of the parcel according to an example embodiment.

In an example embodiment, the robotic mower 100 may include control circuitry 130 that is used to control operation of the robotic mower 100 (e.g., direction and/or speed of movement, blade rotation, and/or the like). The robotic mower 100 may further include a positioning module and an object detection module (each of which will be described in greater detail below), which operate with or under control of the control circuitry 130. Accordingly, the robotic mower 100 may utilize the control circuitry 130 to define map data 140 indicative of the work area 112 on the parcel 110 in terms of defining the boundaries of the work area and/or the location of reference objects thereon. FIG. 4 illustrates an example of map data 140 that may be defined to represent all or a portion of the parcel 110. As seen in FIG. 4, the map data 140 may include recorded positions of the reference objects or reference coordinates, such as GPS coordinates, (represented schematically as generic crosses in FIG. 4). The map data 140 may further define boundaries 150 relative to the positions of the reference objects.

It should be appreciated that although the boundaries 150 are defined as discrete segments that extend between individual ones of the reference objects (e.g., a first segment extending between the first reference object 120 and the second reference object 122, a second segment extending between the second reference object 122 and the third reference object 124, a third segment extending between the third reference object 124 and the fourth reference object 126, and a fourth segment extending between the fourth reference object 126 and the first reference object 120), segments of the boundaries 150 need not extend between two reference objects, or even extend from a single reference object. Instead, boundaries 150 may be defined relative to one or more reference objects (e.g., based on a distance and direction from a reference object, or based on a range of distances over a corresponding range of directions from the reference object). However, in some embodiments, regardless of how the boundaries 150 are defined, the boundaries 150 may form a continuous peripheral limit for a work area of the robotic mower 100.

Figure 5:
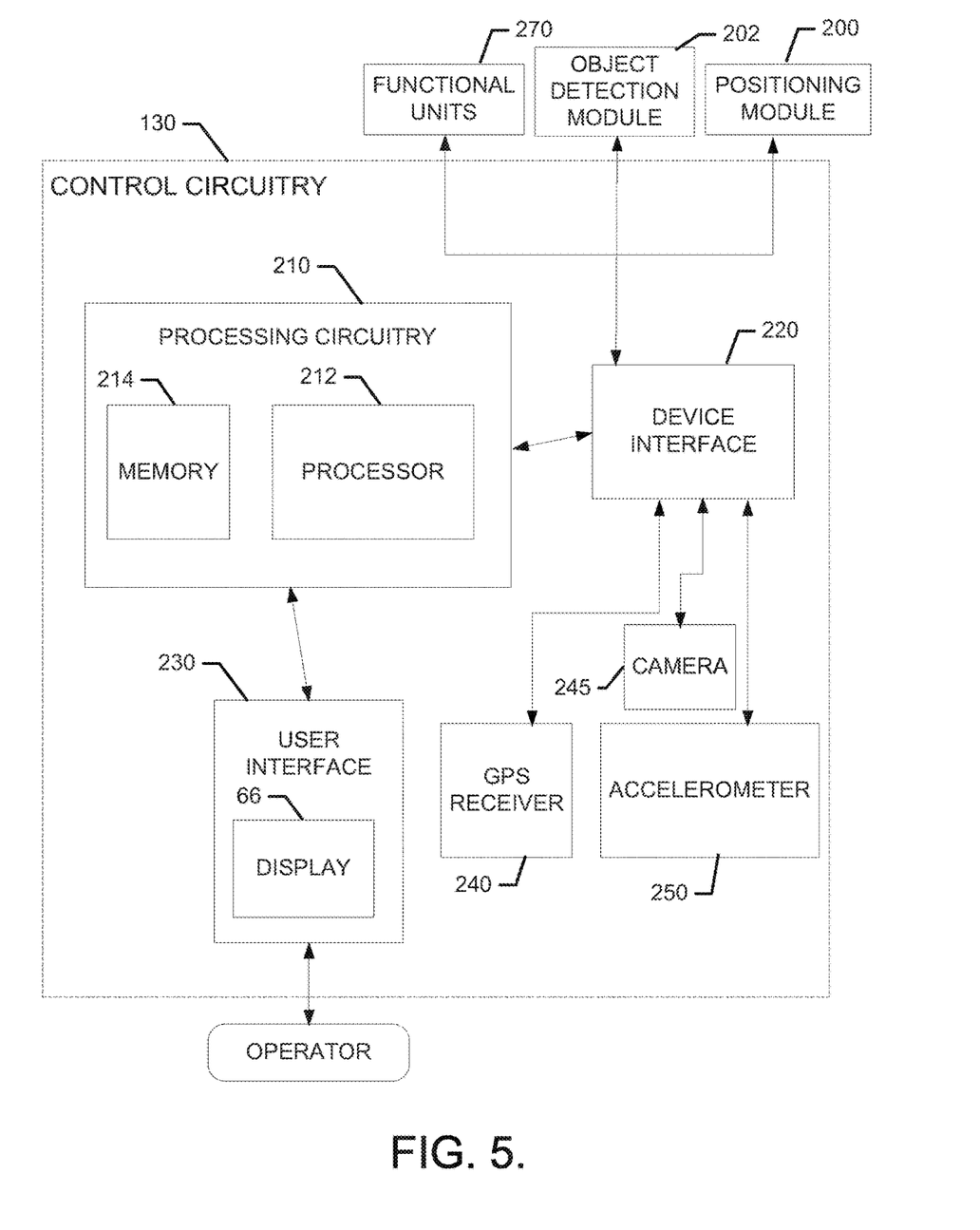
FIG. 5 illustrates a block diagram of various components of processing circuitry of the robotic vehicle to illustrate some of the components that enable the functional performance of the robotic vehicle and to facilitate description of an example embodiment.

FIG. 5 illustrates a block diagram of various components of the control circuitry 130 to illustrate some of the components that enable the functional performance of the robotic mower 100 and to facilitate description of an example embodiment. In some example embodiments, the control circuitry 130 may include or otherwise be in communication with positioning module 200 and an object detection module 202 disposed at the robotic mower 100. As such, for example, the functions attributable to the positioning module 200 and/or the object detection module 202 may be carried out by the control circuitry 130.

The control circuitry 130 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (e.g., display 66). As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors (e.g., sensors 60, collision sensors 70 and/or lifting sensors 72) of the robotic mower 100 via a single data bus. As such, the data bus may connect to a plurality or all of the switching components and/or other electrically controlled components of the robotic mower 100.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., display 66), one or more buttons or keys (e.g., function buttons), and/or other input/output mechanisms (e.g., microphone, speakers, cursor, joystick, lights and/or the like). In this regard, user interface 230 may be in communication with the processing circuitry 210 to receive an indication of a user input, such as time-scheduling instructions and/or task specific instructions for one or more workable zones within a parcel of land, at the user interface 230.

The device interface 220 may include one or more interface mechanisms for enabling communication with other devices (e.g., sensors of a sensor network including sensors 60, collision sensors 70 and/or lifting sensors 72 and/or other accessories or functional units 270 such as motors, servos, switches or other operational control devices for automatic responses). In some cases, the device interface 220 may be any means such as a device or circuitry embodied in either hardware, or a combination of hardware and software that is configured to receive and/or transmit data from/to sensors in communication with the processing circuitry 210. In some example embodiments, the device interface 220 may provide interfaces for communication of components internal to the positioning module 200 and/or the object detection module 202 (as shown in the example of FIG. 5). However, in other embodiments, components of the sensor network (e.g., including GPS receiver 240, camera 245, and/or accelerometer 250) may be external to the positioning module 200 and the object detection module 202, and the device interface 220 may still provide interface capabilities for interaction with such components. Automatic responses such as operational control functions that implement automatic actions to be taken responsive to detection of certain stimuli may also be provided via the device interface 220. For example, shutdown of the cutting motor 62 (e.g., responsive to tipping or lifting of the robotic mower 10), stopping movement or changing direction of the robotic mower 100 (e.g., responsive to encountering an object or boundary) may be initiated under control of the processing circuitry 210 via interfaces provided by the device interface 220. Additionally or alternatively, interactions implemented via the provision of control signals to the functional units 270 may be initiated via the device interface 220.

In embodiments employing a sensor network, the sensor network may include one or more sensors (e.g., sensors 60 and/or collision sensors 70 and lifting sensors 72) disposed at any of various locations on the robotic mower 100 to monitor various parameters. For example, one or more sensors may determine vehicle speed/direction, vehicle location, object presence, vehicle orientation and/or the like. Sensors may also be used to determine motor run time, machine work time, and other operational parameters. In some embodiments, positioning and/or orientation sensors (e.g., global positioning system (GPS) receiver 240 and/or accelerometer 250) may be included to monitor, display and/or record data regarding vehicle position and/or orientation. In this regard, for example, the GPS receiver 240 may be configured to generate map data corresponding to latitude, longitude, speed, elevation, time, data and/or the like of the riding yard maintenance vehicle 10, and communicate such data to the processing circuitry 210. Meanwhile, for example, the accelerometer 250 may be configured to generate data corresponding to horizontal, vertical, and rotational accelerations of the riding yard maintenance vehicle 10, and communicate such data to the processing circuitry 210. As such, information such as pitch angle, roll angle and yaw angle may be determinable using one or more sensors of the sensor network. Moreover, distance and/or direction from a particular point of reference may be determined. Data from the sensors (including the data from the GPS receiver 240, the accelerometer 250 and/or other sensors) may be fed to the processing circuitry 210 for storage, display, or for use in connection with applications that may be executed by processing circuitry 210.

The positioning module 200 may be configured to utilize one or more sensors (e.g., sensors 60, which may include GPS receiver 240, camera 245 and/or accelerometer 250) to determine a location of the robotic mower 100. The robotic mower 100 (or more specifically, the control circuitry 130) may use the location information to determine a mower track and provide full coverage of the parcel 110 to ensure the entire parcel 110 is mowed. The positioning module 200 may therefore be configured to determine a location of the robotic mower 100 relative to the map data 140 descriptive of the parcel 110.

The object detection module 202 may employ one or more sensors (e.g., sensors 60, camera 245, and/or collision sensors 70) to determine when an object is detected. When an object is detected, the processing circuitry 210 may be informed so that the location of the robotic mower 100 at the time of detection of the detected object may be noted. Thus, when an indication is received from the object detection module 202 to inform the processing circuitry 210 that the detected object has been encountered, the processing circuitry 210 may access position information from the positioning module 200 to associate the detected object with the corresponding location. The processing circuitry 210 may further utilize the sensors (e.g., the GPS receiver 240, camera 245 and/or accelerometer 250) to attempt to determine an identity of the object encountered. For example, the processing circuitry 210 may utilize the GPS receiver 240 to determine whether the object is encountered at a location corresponding to the known location of a reference object, utilize the camera 245 to determine if the object visually matches a known image of a reference object, and/or utilize the accelerometer 250 to determine whether the object is located at a distance and/or direction from a reference object that matches a known distance and/or direction that a known reference object has from the reference object.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 200 and the object detection module 202. As such, in some embodiments, the processor 212 (or the processing circuitry 210) may be said to cause each of the operations described in connection with the positioning module 200 and the object detection module 202 by directing the positioning module 200 and the object detection module 202, respectively, to undertake the corresponding functionalities responsive to execution of instructions or algorithms configuring the processor 212 (or processing circuitry 210) accordingly. As an example, the positioning module 200 may be configured to record position and/or orientation information of the robotic mower 100 and the object detection module 202 may be configured to record or otherwise identify interactions with objects as described herein. The processing circuitry 210 may then, in some cases, process the information from one or both of the positioning module 200 and the object detection module 202 to avoid objects, generate alerts, warnings, position histories, map data identifying known and/or unknown object locations, and/or the like.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 200 and/or the object detection module 202 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from the sensor network. Among the contents of the memory 214, applications may be stored for execution by the processor 212 in order to carry out the functionality associated with each respective application. In some cases, the applications may include a comparison of information indicative of a detected object to stored information about the parcel 110 currently being worked in order to determine whether the detected object is a known object.

Thus, for example, the memory 214 may store a parcel descriptor file including map data 140 defining boundaries 150 of the parcel 110 and location information identifying any known (e.g., reference) objects on the parcel 110 along with their respective locations or identifying characteristics (e.g., GPS coordinates or distance/direction from another known location or position, or a reference image). When the detected object is encountered, the map data 140 of the parcel descriptor file may be accessed (via the processing circuitry 210) to determine whether the detected object correlates to one of the reference objects on the parcel 110 via a comparison of the location of the detected object to the corresponding locations of known objects on the parcel 110 or via a comparison of a reference image to a current image. If a reference object on the parcel 110 is found to match the location of the detected object, the detected object may be determined (via the processing circuitry 210) to be a corresponding one of the reference objects. Boundary positions may then be determined and the robotic mower 100 may be steered in a manner that keeps the robotic mower 100 within the work area 112.

In some embodiments, the reference objects may be marked with unique, optically readable marks. Accordingly, for example, each unique mark may be identified and its position may be known on the map data 140. The robotic mower 100 may then be further programmed to move relative to each known reference object in a particular manner to achieve complete coverage of the work area 112 without transiting outside of the work area 112. In some cases, the work area 112 may be defined as a polygon, or as a series of adjacent or relatively nearby polygons, so that the robotic mower 110 may sequentially mow polygonal shaped work areas. The camera 245 may be used to identify or read unique markings and, in some cases, employ triangulation, stereo view, and/or the like to determine a location relative to the reference object 120, 122, 124, 126. Given the known location of the boundaries 150 relative to the reference objects, if the object can be determined as a reference object and the location of the robotic mower 100 can be determined relative to the reference object, then the position of the robotic mower 100 relative to the boundaries 150 can be determined. In some cases, the markings may be defined to indicate or represent a sequential ordering of the reference objects.

In an example embodiment, the processing circuitry 210 may be configured to record the locations of any and all reference objects and associate the locations with GPS coordinates. Thus, for example, the processing circuitry may be configured to "learn" the locations of the reference objects and therefore also "learn" the locations of the boundaries 150. After learning the boundaries 150 in terms of GPS coordinates (or in terms of distance from a known starting point such as the charging station), the robotic mower 100 may simply operate within the work area 112 based on the learned information. Thus, for example, the reference objects themselves (all or a portion thereof) may be removed.

Figure 6:
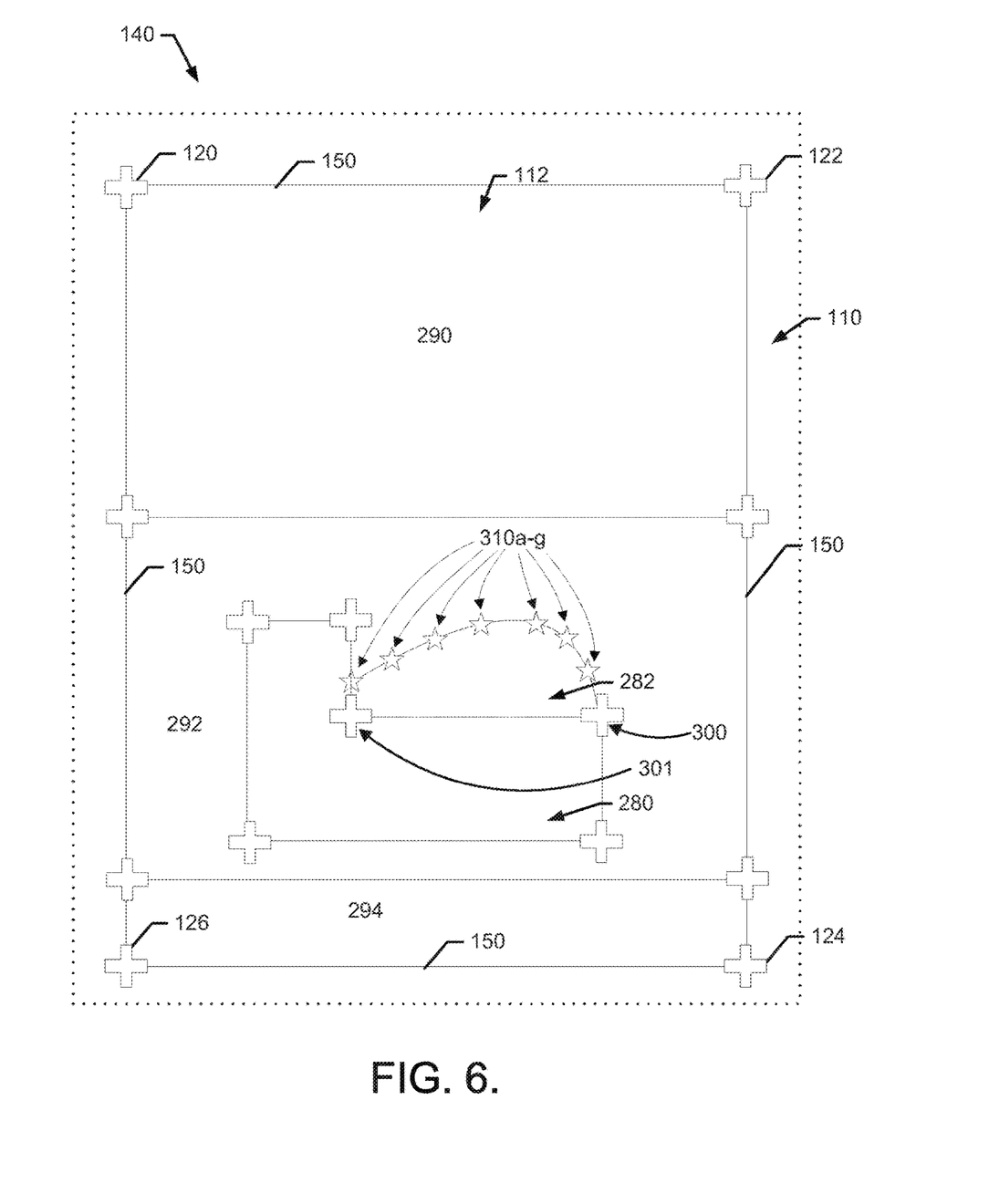
FIG. 6 illustrates an example in which a plurality of zones, including two exclusion zones, are defined by sets of reference coordinates or objects located fully within a work area according to an example embodiment.

In some embodiments, a plurality of discrete zones, such as one or more workable zones and one or more exclusionary zones (e.g., exclusion areas), may further be defined within the work area 112. For example, FIG. 6 shows an example in which multiple workable zones (e.g., areas in which the robotic vehicle may operate) 290, 292, and 294 defined by respective sets of reference objects or reference coordinates. FIG. 6 also shows an example in which multiple exclusionary zones 280, 282 are defined by respective sets of reference objects or reference coordinates. Exclusionary zone 280, for example, may represent an area in which a house or building is located. Exclusionary zone 282, for example, may represent a patio or deck. Outside patios or decks may be defined by non-linear boundaries as shown in FIG. 6. In such embodiments, for example, the non-linear portion of the exclusionary boundary may be defined by a plurality or series of reference objects or reference coordinates 310*a-g* that may, for example, provide enough points to define a mathematical representation of the non-linear portion of the boundary. As shown in FIG. 6, for example, the exclusionary zone 282 can be defined by the area located between the mathematical representation of the non-linear portion of the boundary obtained from reference objects or reference coordinates 310*a-g* and one or both of the reference object(s) or reference coordinate(s) 300, 301. Furthermore, information associated with the respective boundaries of one or more workable zones and one or more exclusionary zones may be stored in association with one or more reference objects or reference coordinates. Thus, when a reference object or reference coordinate is encountered, it may be appreciated as to which boundaries it is useful in defining.

In some embodiments, rather than utilizing physical objects for the reference objects, a painted line, marking (visible or invisible), or series of coordinates defining a virtual reference line that can be detected by a sensor may be employed as an alternative. Other information about details regarding the map data 140 may also be stored in some embodiments. For example, information about fence location, gravel, concrete or paved path location, road location, object location (i.e., non-reference objects), and/or the like may also be stored in connection with the map data 140.

In an example embodiment, the processing circuitry 210 may be configured to generate display views and/or screen emulations to display data gathered by the sensor network and/or to display information generated based on the data gathered by the sensor network either locally or remotely (responsive to communication of the information via a wireless network or via communication established at the charge station 40. Alternatively or additionally, the processing circuitry 210 may be configured to generate reports or displays to illustrate information determinable based on the data. In some embodiments, the processing circuitry 210 may process, direct display of and/or store GPS position data (e.g., as a position history), speed information, information regarding object detection, map views, and/or the like. Thus, for example, the processing circuitry 210 may direct storage of the data or other information generated based on the data in the memory 214. As such, the processing circuitry 210 may organize the data or information for reporting or for use in other applications that may be locally or remotely executed. For example, the processing circuitry 210 may store data for reporting to a computer executing fleet management software to manage a fleet of lawn mowers for implementation of efficient service, maintenance and operation management.

In some cases, information associated with the positioning module 200 and/or the object detection module 202 itself may be extracted from the robotic mower 10 and mated with a remote network terminal or computer. The information stored on the memory 214 may then be extracted and thereby reported for fleet management or other applications. In other cases, the device interface 220 may be configured to wirelessly transmit information associated with the positioning module 200 and/or the object detection module 202 to a remote computer to enable data processing to be accomplished on the remote computer. For example, in some cases, Bluetooth, WiFi or other wireless communication modules may be provided by the device interface 220 in order to allow wireless downloading of software, support information or other data, or allow wireless uploading of data to network devices for support, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 214 to the removable memory device and thereafter to the remote computer. Thus, in some embodiments, the map data 140 may be communicated to an external computer and may be manipulated thereat, or may be correlated to other map information (e.g., map information from web based mapping services).

In some cases, information may also be uploaded from the remote network terminal or computer to the positioning module 200 and/or the object detection module 202. For example, upgrading software to improve the functionality of the positioning module 200 and/or the object detection module 202 may be uploaded. In some embodiments, software upgrading user interface capabilities, adding new sensor interface capability, and/or adding other improved functionality may be added via upload in order to upgrade the positioning module 200 and/or the object detection module 202.

Accordingly, example embodiments may avoid the use of a boundary wire by placing reference objects that are detectable by the robotic mower at one or more locations of a work area. The reference objects may be mapped to map data and may be used to either learn boundaries of the work area or one or more discrete workable zones within the parcel of interest (for removal prior to subsequent working of the work area) or assist in defining those boundaries while the robotic mower operates in the work area as a whole or in one or more workable zones within the parcel of interest.

Embodiments of the present invention may therefore be practiced using an apparatus such as the one depicted in FIG. 5. However, other embodiments may be practiced in connection with a computer program product for performing embodiments of the present invention. As such, for example, each block or step of the flowcharts of FIG. 7 and FIG. 8, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s) illustrated in FIG. 7 and FIG. 8. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s) illustrated in FIG. 7 and FIG. 8. In this regard, a method according to example embodiments of the invention may include any or all of the operations shown in FIG. 7 and/or FIG. 8. Moreover, other methods derived from the descriptions provided herein may also be performed responsive to execution of steps associated with such methods by a computer programmed to be transformed into a machine specifically configured to perform such methods.

Figure 7:
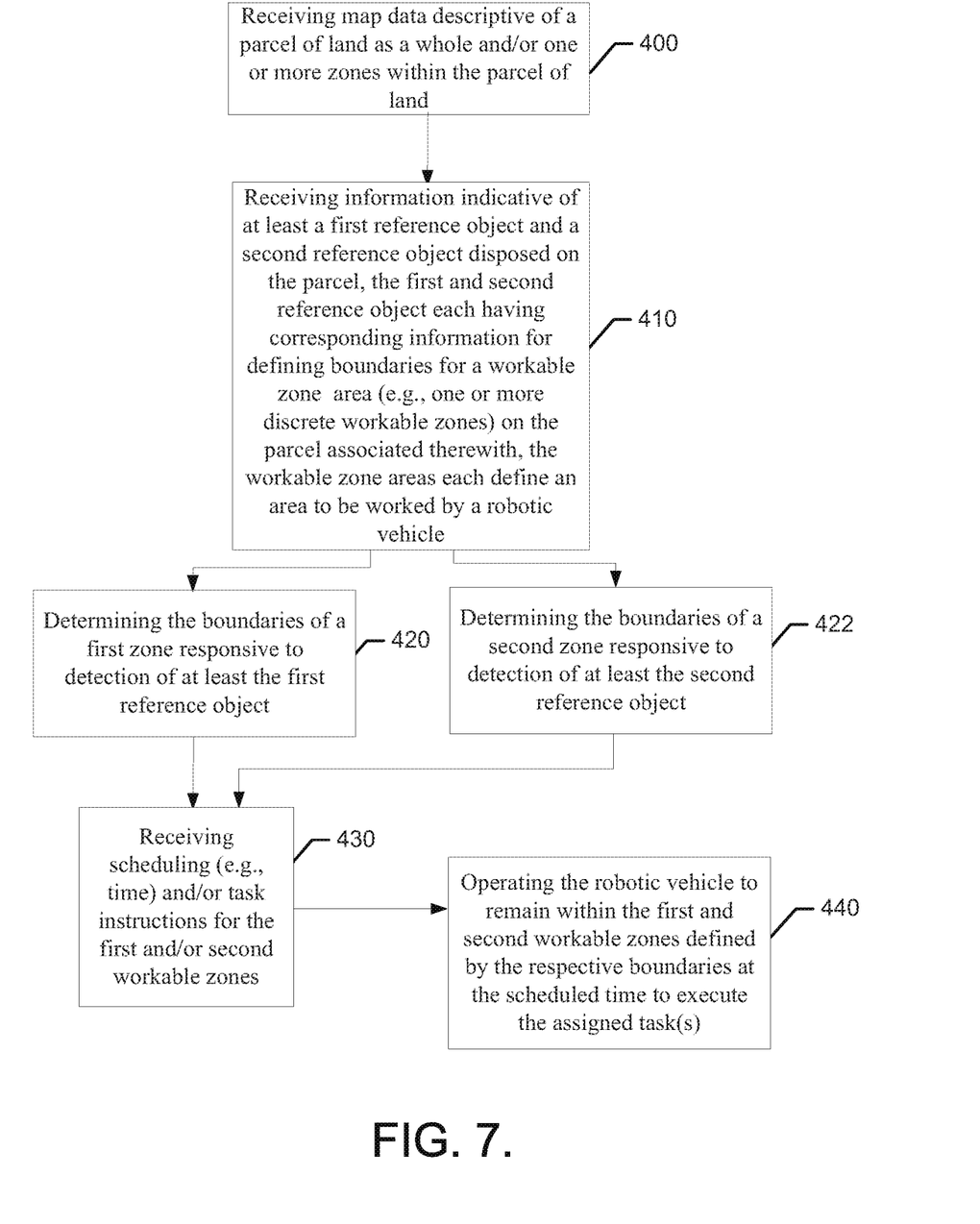
FIG. 7 illustrates a block diagram of a method according to an example embodiment.

In an example embodiment, a method for defining one or more sets of boundaries, such as respective boundaries for one or more workable zones, for operation of a robotic vehicle (e.g., a mower or watering device), as shown in FIG. 7, may include receiving map data descriptive of a parcel of land as a whole and/or one or more zones located within the parcel 400 and receiving information indicative of a plurality of reference objects including at least a first reference object disposed on the parcel and a second reference object disposed on the parcel 410. The first reference object may have corresponding information for defining boundaries for a first workable zone (e.g., discrete area within the parcel to be worked by a robotic vehicle) on the parcel associated therewith. Similarly, the second reference object may have corresponding information for defining boundaries for a second workable zone (e.g., discrete area within the parcel to be worked by a robotic vehicle) on the parcel associated therewith. The method may further include determining the boundaries of the first workable zone responsive to detection of at least the first reference object 420 and determining the boundaries of the second workable zone responsive to detection of at least the second reference object 422. The method may further comprise receiving time-scheduling instructions for the first workable zone and the second workable zone. The method may also comprise operating the robotic vehicle 440 to remain within the first workable zone defined by the boundaries of the first workable zone and within the second workable zones defined by the boundaries of the second workable zone in response to the time-scheduling instructions. For example, the received time-scheduling instructions can define or set a time frame (e.g., a duration of time) for the robotic vehicle to work within the respective workable zones.

In some embodiments, the time-scheduling instructions comprise a first time frame for operating the robotic vehicle within the first workable zone and a second time frame for operating the robotic vehicle within the second workable zone. In some embodiments, the first time frame comprises a first duration of time and the second time frame comprises a second duration of time, in which the first duration of time and the second duration of time are different (although they could be identical if desired). In one example embodiment, the first time frame and the second time frame may be separated by an intermediate third time frame. In such embodiments, for example, the robotic vehicle returns to or remains at a charging station during the intermediate third time frame.

Some embodiments may further comprise receiving task instructions for the first workable zone, the second workable zone, or both. The task instructions for the first workable zone may, for example, be different than the task instructions for the second workable zone. For example, the task instructions for the first workable zone comprise mowing grass at a first height and the task instructions for the second workable zone comprise mowing grass at a second height. Additionally or alternatively, the task instructions for the first workable zone may comprise a first activity and the task instructions for the second workable zone comprise a second activity which is different than the first activity. In some embodiments, the first activity may include mowing grass and the second activity may exclude mowing grass. In an example embodiment, the first activity may include mowing grass and the second activity may comprise one or more of watering, mulching, tilling, seeding, or fertilizing.

In some embodiments, the method may further comprise receiving information indicative of at least one exclusionary reference object disposed on the parcel. The exclusionary reference object may have corresponding information for defining boundaries for an exclusionary zone (e.g., an area in which the robotic mower will not enter) on the parcel associated therewith. In an example embodiment, the method may further comprise determining the boundaries of the exclusionary zone responsive to detection of at least the exclusionary reference object. In such embodiments, for instance, the method may comprise operating the robotic vehicle to remain within the first workable zone defined by the boundaries of the first workable zone and within the second workable zones defined by the boundaries of the second workable zone in response to the time-scheduling instructions, while not entering the exclusionary zone.

In an example embodiment, an apparatus for performing the method of FIG. 7 above, for example, may comprise a processor (e.g., the processor 212) configured to perform some or each of the operations (400-440) described above. The processor 212 may, for example, be configured to perform the operations (400-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-440 may comprise, for example, the control circuitry 130. Additionally or alternatively, at least by virtue of the fact that the processor 212 may be configured to control or even be embodied as the control circuitry 130, the processor 212 and/or a device or circuitry for executing instructions or executing an algorithm for processing information as described above may also form example means for performing operations 400-440.

Figure 8:
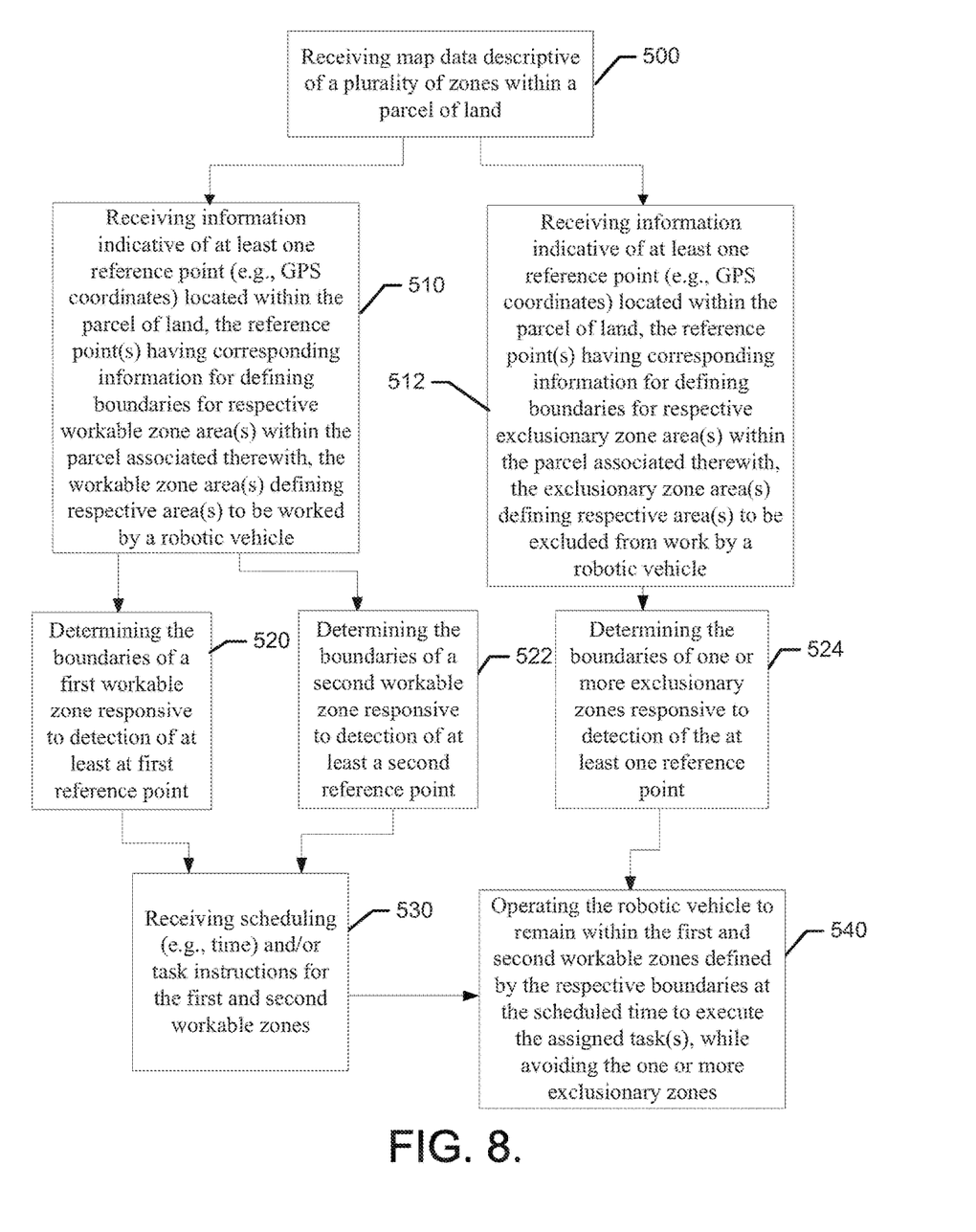
FIG. 8 illustrates a block diagram of a method according to an additional example embodiment.

In another example embodiment, a method for defining one or more set of boundaries, such as respective boundaries for at least one workable zone and at least one exclusionary zone, for operation of a robotic vehicle (e.g., a mower), as shown in FIG. 8, may include receiving map data descriptive of a plurality of zones located within a parcel of land 500. The method may also include receiving information indicative of a plurality of reference points or coordinates, such as GPS coordinates, including at least a first reference coordinate located on the parcel and a second reference coordinate located on the parcel 510. The first reference coordinate may have corresponding information for defining boundaries for a first workable zone (e.g., discrete area within the parcel of land to be worked by a robotic vehicle) on the parcel associated therewith. Similarly, the second reference coordinate may have corresponding information for defining boundaries for a second workable zone (e.g., discrete area within the parcel of land to be worked by a robotic vehicle) on the parcel associated therewith. The method may further include determining the boundaries of the first workable zone responsive to detection of at least the first reference coordinate 520 and determining the boundaries of the second workable zone responsive to detection of at least the second reference coordinate 522. As shown in FIG. 8, the method may also include receiving information indicative of at least one exclusionary reference coordinate located on the parcel 512, in which the exclusionary reference coordinate may have corresponding information for defining boundaries for an exclusionary zone (e.g., a discrete area to not be entered by the robotic vehicle) on the parcel associated therewith. The method may also include determining the boundaries of the exclusionary zone responsive to detection of at least the exclusionary reference coordinate 524.

As illustrated, for example, by FIG. 8, the method may also include receiving time-scheduling instructions and/or task instructions for the first workable zone and the second workable zone 530. The method may also include operating the robotic vehicle to remain within the first workable zone defined by the boundaries of the first workable zone and within the second workable zones defined by the boundaries of the second workable zone in response to the time-scheduling instructions 540. The method may further comprise operating the robotic vehicle to not enter the exclusionary zone.

The time-scheduling instructions, in accordance with some embodiments, may comprise, for example, a first time frame for operating the robotic vehicle within the first workable zone and a second time frame for operating the robotic vehicle within the second workable zone. For example, the first time frame may include a first duration of time and the second time frame may comprise a second duration of time. The first and second durations of time may be the same or different if desired. If the first workable zone is significantly larger than, for example, the second workable zone, the first duration of time (e.g., amount of time the robotic vehicle is working in the first workable zone) may set by the user, either remotely or via the user interface, to be greater than the second duration of time (e.g., amount of time the robotic vehicle is working in the second workable zone).

In some embodiments, the first time frame and the second time frame may be separated by an intermediate third time frame. For example, the first time frame may be set for operation in the first workable zone from 9:00 am to 11:00 am, while the second time frame may be set for operation in the second workable zone from 2:00 pm to 3:30 pm. In this exemplary embodiment, intermediate time frame may comprise from after 11:00 am to about 2:00 pm. In this regard, a user can input or set the respective workable zones and time frames for each workable zone for which the robotic vehicle will operate. In the foregoing example, for example, the third intermediate time frame may correspond to operational downtime when any noise associated with operation of the robotic vehicle may be undesirable (e.g., lunch, garden party, etc.). In some embodiments, the robotic vehicle returns to or remains at a charging station during at least a portion of the intermediate third time frame.

Methods according to some embodiments may further comprise receiving task instructions for at least the first workable zone and the second workable zone. The task instructions for the first workable zone may be the same as or different than the task instructions for the second workable zone. For example, the task instructions for the first workable zone may comprise mowing grass at a first height and the task instructions for the second workable zone comprise mowing grass at a second height being different than the first height. In some embodiments, the task instructions for the first workable zone may comprise a first activity and the task instructions for the second workable zone comprise a second activity that is different than the first activity. For example, the first activity may comprise mowing grass and the second activity may include a variety of tasks, such as one or more of watering, mulching, tilling, seeding, or fertilizing, while excluding a task of mowing grass.

In an example embodiment, an apparatus for performing the method of FIG. 8 above, for example, may comprise a processor (e.g., the processor 212) configured to perform some or each of the operations (500-540) described above. The processor 212 may, for example, be configured to perform the operations (500-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-540 may comprise, for example, the control circuitry 130. Additionally or alternatively, at least by virtue of the fact that the processor 212 may be configured to control or even be embodied as the control circuitry 130, the processor 212 and/or a device or circuitry for executing instructions or executing an algorithm for processing information as described above may also form example means for performing operations 500-540.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method, comprising:
    receiving map data descriptive of a plurality of zones located within a parcel of land;
    receiving information indicative of a plurality of reference objects including at least a first reference object disposed on the parcel and a second reference object disposed on the parcel, the first reference object having corresponding information for defining boundaries for a first workable zone on the parcel associated therewith and the second reference object having corresponding information for defining boundaries for a second workable zone on the parcel associated therewith;
    determining the boundaries of the first workable zone responsive to detection of at least the first reference object;
    determining the boundaries of the second workable zone responsive to detection of at least the second reference object;
    receiving time-scheduling instructions for the first workable zone and the second workable zone; and
    operating a robotic vehicle to remain within the first workable zone defined by the boundaries of the first workable zone and within the second workable zones defined by the boundaries of the second workable zone in response to the time-scheduling instructions,
    wherein the time-scheduling instructions comprise a first time frame for operating the robotic vehicle within the first workable zone and a second time frame for operating the robotic vehicle within the second workable zone.

2. The method of claim 1, wherein the first time frame comprises a first duration of time and the second time frame comprises a second duration of time, said first duration of time and said second duration of time being different.

3. The method of claim 1, wherein the first time frame and the second time frame are separated by an intermediate third time frame.

4. The method of claim 3, wherein the robotic vehicle returns to or remains at a charging station during the intermediate third time frame.

5. The method of claim 1, further comprising receiving task instructions for the first workable zone and the second workable zone.

6. The method of claim 5, wherein the task instructions for the first workable zone are different than the task instructions for the second workable zone.

7. The method of claim 6, wherein the task instructions for the first workable zone comprise mowing grass at a first height and the task instructions for the second workable zone comprise mowing grass at a second height.

8. The method of claim 7, wherein the task instructions for the first workable zone comprise a first activity and the task instructions for the second workable zone comprise a second activity.

9. The method of claim 8, wherein the first activity comprises mowing grass and the second activity excludes mowing grass.

10. The method of claim 9, wherein the first activity comprises mowing grass and the second activity comprises one or more of watering, mulching, tilling, seeding, or fertilizing.

11. The method of claim 1, further comprising receiving information indicative of at least one exclusionary reference object disposed on the parcel, the exclusionary reference object having corresponding information for defining boundaries for an exclusionary zone on the parcel associated therewith.

12. The method of claim 11, further comprising determining the boundaries of the exclusionary zone responsive to detection of at least the exclusionary reference object.

13. The method of claim 12, further comprising operating the robotic vehicle to not enter the exclusionary zone.

14. An apparatus, comprising processing circuitry configured for:
    receiving map data descriptive of a plurality of zones located within a parcel of land;
    receiving information indicative of a plurality of reference objects including at least a first reference object disposed on the parcel and a second reference object disposed on the parcel, the first reference object having corresponding information for defining boundaries for a first workable zone on the parcel associated therewith and the second reference object having corresponding information for defining boundaries for a second workable zone on the parcel associated therewith;
    determining the boundaries of the first workable zone responsive to detection of at least the first reference object;
    determining the boundaries of the second workable zone responsive to detection of at least the second reference object;
    receiving time-scheduling instructions for the first workable zone and the second workable zone; and
    operating a robotic vehicle to remain within the first workable zone defined by the boundaries of the first workable zone and within the second workable zones defined by the boundaries of the second workable zone in response to the time-scheduling instructions,
    wherein the time-scheduling instructions comprise a first time frame for operating the robotic vehicle within the first workable zone and a second time frame for operating the robotic vehicle within the second workable zone.

15. A method, comprising:
    receiving map data descriptive of a plurality of zones located within a parcel of land;
    receiving information indicative of a plurality of reference coordinates including at least a first reference coordinate located on the parcel and a second reference coordinate located on the parcel, the first reference coordinate having corresponding information for defining boundaries for a first workable zone on the parcel associated therewith and the second reference coordinate having corresponding information for defining boundaries for a second workable zone on the parcel associated therewith;

determining the boundaries of the first workable zone responsive to detection of at least the first reference coordinate;

determining the boundaries of the second workable zone responsive to detection of at least the second reference coordinate;

receiving time-scheduling instructions for the first workable zone and the second workable zone;

operating a robotic vehicle to remain within the first workable zone defined by the boundaries of the first workable zone and within the second workable zones defined by the boundaries of the second workable zone in response to the time-scheduling instructions; and receiving task instructions for the first workable zone and the second workable zone.

16. The method of claim 15, further comprising receiving information indicative of at least one exclusionary reference coordinate located on the parcel, the exclusionary reference coordinate having corresponding information for defining boundaries for an exclusionary zone on the parcel associated therewith.

17. The method of claim 16, further comprising determining the boundaries of the exclusionary zone responsive to detection of at least the exclusionary reference coordinate.

18. The method of claim 17, further comprising operating the robotic vehicle to not enter the exclusionary zone.

19. An apparatus, comprising processing circuitry configured for:

receiving map data descriptive of a plurality of zones located within a parcel of land;

receiving information indicative of a plurality of reference coordinates including at least a first reference coordinate located on the parcel and a second reference coordinate located on the parcel, the first reference coordinate having corresponding information for defining boundaries for a first workable zone on the parcel associated therewith and the second reference coordinate having corresponding information for defining boundaries for a second workable zone on the parcel associated therewith;

determining the boundaries of the first workable zone responsive to detection of at least the first reference coordinate;

determining the boundaries of the second workable zone responsive to detection of at least the second reference coordinate;

receiving time-scheduling instructions for the first workable zone and the second workable zone;

operating a robotic vehicle to remain within the first workable zone defined by the boundaries of the first workable zone and within the second workable zones defined by the boundaries of the second workable zone in response to the time-scheduling instructions; and receiving task instructions for the first workable zone and the second workable zone.

* * * * *